Figure 1:
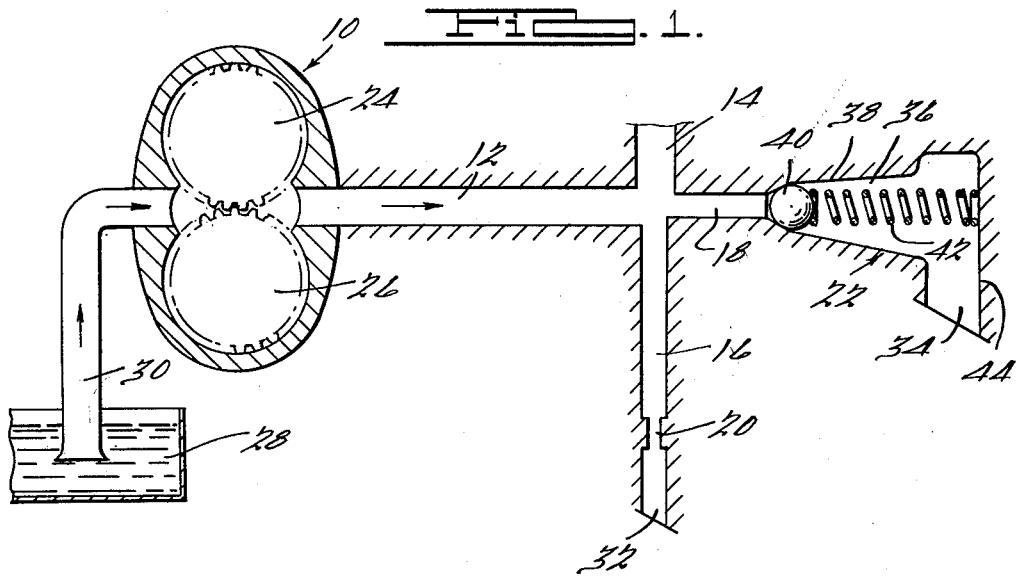

May 25, 1965   N. T. GENERAL ETAL   3,184,978
FLUID PRESSURE GOVERNOR MECHANISM
Filed April 17, 1963

Norman T. General
Robert P. Zundel
INVENTORS.

BY John R. Faulkner
Robert E. McCollum
ATTORNEYS.

United States Patent Office 3,184,978
Patented May 25, 1965

3,184,978
FLUID PRESSURE GOVERNOR MECHANISM
Norman T. General, Orchard Lake, and Robert P. Zundel, Wayne, Mich., assignors to Ford Motor Company, Dearborn, Mich., a corporation of Delaware
Filed Apr. 17, 1963, Ser. No. 273,654
4 Claims. (Cl. 73—523)

This invention relates to a fluid pressure governor, and more particularly to one of the single stage type providing a fluid pressure varying as a function of the change in speed of rotation of the fluid source.

Known single stage fluid pressure governors generally provide only a parabolic type speed versus governor pressure curve, which gives a slow rate of change in pressure at low r.p.m.s. of the pump, and a rapid rate of change at high pump speeds. Also, there is generally no way in which the pressure rate of change can be made to deviate from this curve. This type of governor, therefore, is unsatisfactory where a fast initial rise in pressure is desired or where an entirely different type of curve is desired to meet the particular control requirements.

The present invention provides a governor construction permitting freedom of selection of the change in rate of the fluid pressure rise as a function of the change in speed of the fluid source. That is, the control system of this invention provides a fluid pressure signal that not only can be made to follow a parabolic curve relationship of speed versus pressure, if so desired, but can also be made to follow other relationships. In the particular embodiment to be described, the pressure signal is made to follow a curve providing a fast initial rate of change of pressure at low pump speeds, with a relatively slow rate of change at higher speeds, which is substantially opposite to that provided by a conventional single stage governor construction.

The construction of the invention, therefore, provides a greater degree of control, and especially in cases, for example, where the pressure signal is to be used as being indicative of changes in vehicle speed to control light throttle or coasting downshifts in an automatic transmission for a motor vehicle. This greater control is accomplished by positioning a plurality of flow restricting orifices in the discharge line of a variable speed fluid pump, at least one orifice being of a variable area type responsive to speed and pressure changes so as to constantly control the rate of change of the pressure.

It is therefore an object of the invention to construct a fluid pressure regulating system so as to provide a fluid pressure signal having a selectively controllable, variable rate of change with changes in the speed of rotation of the fluid source.

It is a further object of the invention to construct a fluid pressure regulating system so as to provide a fluid pressure signal having a fast rate of change at low speeds of rotation of the fluid source, and a slower rate of change at higher speeds.

A still further object of the invention is to provide a fluid pressure governor system consisting of a variable speed fluid pump providing a pressure having a variable rate of change as controlled by a number of cooperating flow restricting orifices, at least one of which is of a variable area type.

Another object of the invention is to provide a fluid pressure governor system consisting of a variable speed fluid pump having a number of orifices in parallel relationship in the discharge line, one orifice of fixed area providing an initial predetermined rate of change of the pressure in the line, and a variable area orifice subsequently altering the rate of change of the fluid pressure.

Figure 2:
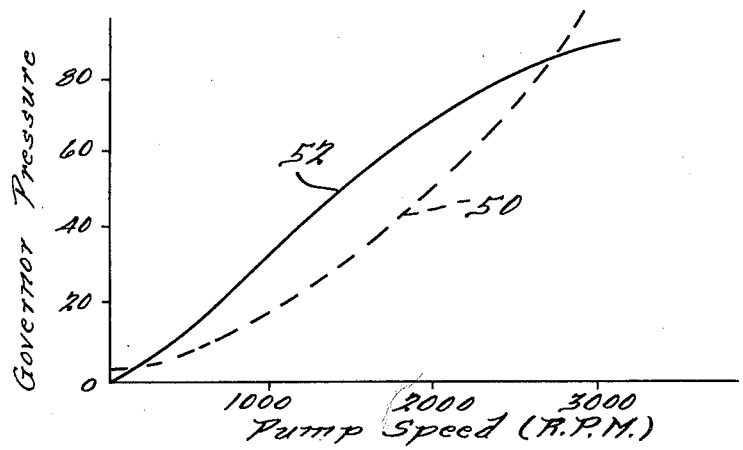

Other objects, features and advantages of the invention will become apparent upon reference to the succeeding, detailed description thereof, and to the drawing illustrating the preferred embodiment thereof; wherein, FIGURE 1 is a schematic representation of a fluid pressure system embodying the invention; and, FIGURE 2 is a graphic illustration of the relationship between the change in fluid pressure with a change in the speed of the fluid pressure source resulting from the construction according to the invention as compared to a known type of construction.

FIGURE 1 shows, in general, a variable speed fluid pump 10 discharging fluid into a plurality of interconnected supply and exhaust or vent lines 14, 16 and 18. The vent lines 16 and 18 are controlled by a fixed area orifice 20 and a variable area orifice 22 so as to provide a fluid pressure in line 14 having the desired rate of change with changes in the speed of the pump.

More specifically, fluid pump 10, which is of the gear type, has a driving gear 24 adapted to be driven by any suitable rotating source (not shown). Preferably, the pump would be driven by the tailshaft or power output shaft of a vehicle transmission so that the change in pressure would be indicative of a change in vehicle speed. Driving gear 24 meshes with a driven gear 26 so as to draw fluid from a sump 28 through an inlet line 30 for discharge into a main supply line 12. Line 12 has a number of branches 14, 16 and 18, the line 14 constituting the output or supply pressure line, which in this case could be a governor pressure signal line leading to a shift valve of an automatic transmission control system, for example. The lines 16 and 18 are vent lines open to a sump (not shown) through outlets 32 and 34.

Line 16 is constructed with a flow restricting orifice 20 of a constant area. This orifice controls the initial rise and the rate of change of pressure in line 14, in a manner to be described more clearly later. The vent line 18 contains a variable area orifice 22. As shown, the line 18 is expanded to diverge in a downstream direction to form a substantially conical hollow fluid chamber 36 having tapering walls 38. The opposite end of the conical chamber communicates with the fluid outlet 34. A substantially spherical ball valve member 40 is slidably seated in the inlet end of chamber 36 so as to block the inlet at times, and is biased to this position by means of a controlled rate spring 42 between the ball and the end 44 of the chamber.

The rise in pressure in line 18 above the initial force of spring 42 will unseat the ball valve moving it progressively to the right as the output of pump 10 and the pressure in line 18 continue to rise. This permits a progressively increasing amount of fluid to escape to outlet 34 through the increasing annular differential area between the ball and the conical chamber. The movement of the ball to the right therefore provides an orifice of progressively increasing size controlling the rate of change of the pressure in line 14.

The orifice 22 thus has three parameters which may be individually varied to change the characteristics of the pressure curve. That is, the diameter of the ball, the slope of the tapered wall 38, and the spring rate, can each be controlled selectively to provide any number of different rates of change of the pressure rise in line 14.

FIGURE 2 shows, in dotted lines, the parabolic curve 50 illustrating the rate of change of the fluid pressure produced by a conventional type of single stage fluid pressure governor. The curve provides a slow initial rate of fluid pressure change at low pump speeds, and a fast rate of change in the pressure at high pump speeds. The curve 52 depicts the rate of change of the pressure effected by the construction shown in FIGURE 1, using a particular set of dimensions and spring rate for the orifice 22. This curve provides a fast initial rate of change, and a relatively slower rate of change at higher pump speeds. It will be clear, therefore, that many curves other than that illustrated can be obtained, simply by varying the parameters described above. The invention therefore provides a large degree of flexibility in the choice of different rates of change of the pressure in line 14.

In this particular instance, the spring rate is chosen so as to prevent unseating of the ball 40 until the fluid pressure in line 18 has reached approximately 12½ p.s.i., corresponding approximately to 400 r.p.m. of the fluid pump 10.

In operation, with ball 40 seated to block line 18, rotation of pump 10 discharges fluid into lines 12, 14, 16 and 18, the fluid being metered through the fixed area orifice 20 to the sump. Orifice 20 provides an initial pressure buildup in lines 14, 16 and 18 by the existence of a pressure drop across the orifice. The pressure rise change, therefore, varies as a function of the change in speed and fluid output of the pump and the area of orifice 20, initially following the lower portion of curve 52 to provide a fast rate of change in the pressure in line 14.

When the pump speed reaches approximately 400 r.p.m., the output pressure in line 14 has reached approximately 12½ p.s.i., at which point, ball 40 unseats slightly to provide a small annular differential area between the ball and tapered wall 38 through which fluid in passage 18 is orificed to escape into the outlet 34. This venting of the fluid therefore reduces the rate of pressure rise in line 14. Continued increase in pump fluid output results in a progressive increase in the area of orifice 22 upon further unseating of valve 40 to further increase the exhaust of fluid, thereby further variably and progressively decreasing the rate of pressure rise.

Thus, it will be seen that the rate of change of the fluid pressure in line 14 is controlled in a variable manner by the progressive unseating of the valve 40 in accordance with the changes in the speed and fluid output of pump 10, as reflected by the change in the slope of curve 52 in FIGURE 2.

From the foregoing, therefore, it will be seen that the invention provides a speed responsive fluid pressure governor by means of a simple construction utilizing mechanical flow restricting orifices in the discharge line of a variable speed pump, and that the governor is one having controllable characteristics to provide any number of different rates of change of the pressure signal with changes in the pump output.

While the invention has been illustrated in its preferred embodiment, it will be clear to those skilled in the arts to which the invention pertains that many changes and modifications may be made thereto without departing from the scope of the invention.

We claim:

1. A fluid pressure regulating mechanism comprising, in combination, a rotatable fluid pressure pump providing a source of fluid under pressure varying as a function of the speed of said pump, fluid supply and vent lines connected to said pump, and a plurality of flow restricting orifice means in said lines controlling the pressure of the fluid from said pump, said means including a variable area orifice for controlling the rate of change of the fluid pressure differential across the remaining of said orifices, said variable area orifice means comprising an annular fluid chamber in the line associated therewith having a tapered wall progressively increasing in area, valve means in said chamber slidable from a position in contact with said chamber wall to block said latter line to positions along said chamber increasing the communication of fluid through said chamber from said line, means biasing said valve to a line blocking position, said valve being movable in opposition to the force of said biasing means in response to a change in the fluid pressure in the line associated therewith.

2. A fluid pressure regulating system, comprising, in combination, a variable speed fluid pressure pump, a fluid supply and a plurality of fluid vent lines connected to each other and to said pump, a first flow restricting orifice means in one of said vent lines for providing a changing fluid pressure in said supply line, and a second variable area orifice means in a second of said vent lines for controlling the pressure differential across said first orifice means to vary the rate of pressure change of fluid in said supply line, said variable area orifice means comprising a conical chamber in said second line having a ball valve therein, means biasing said valve to a position blocking said second line, said ball valve being subjected to the force of fluid under pressure in said line thereagainst to move along said chamber in opposition to said biasing means to progressively change the pressure differential on opposite sides of said ball valve.

3. A fluid pressure regulating system, comprising, in combination, a variable speed fluid pressure pump, a fluid supply and a plurality of fluid vent lines connected to each other and to said pump, a first flow restricting orifice means of fixed area in one of said vent lines for providing a fluid pressure in said supply line changing as a function of the speed of said pump, and a second variable area orifice means in a second of said vent lines for controlling the pressure differential across said first orifice means to vary the rate of pressure change of fluid in said supply line, said latter orifice means including a conical chamber in said second line having a ball valve member therein spring biased to a position closing said chamber and movable in response to a rise in the pressure in said line to progressively increase the communication of fluid from said line past said valve member.

4. A fluid pressure regulating system, comprising, in combination, a variable speed fluid pressure pump, a fluid supply and a plurality of fluid vent lines connected to each other and to said pump, a first flow restricting orifice means of fixed area in one of said vent lines for providing a fluid pressure in said supply line changing as a function of the speed of said pump, and a second variable area orifice means in a second of said vent lines for controlling the pressure differential across said first orifice means to vary the rate of pressure change of fluid in said supply line, said latter orifice means including a conical chamber in said second line having a ball valve member therein spring biased to a position closing said chamber and movable above a predetermined speed of said pump and pressure in said line to progressively increase the communication of fluid from said line past said valve member.

References Cited by the Examiner

UNITED STATES PATENTS

| | | | |
|---|---|---|---|
| 675,564 | 6/01 | Kent | 73—523 |
| 772,294 | 10/04 | Ribourt | 137—36 |
| 778,399 | 12/04 | Brown | 73—502 |
| 783,679 | 2/05 | Caille | 73—502 |
| 1,807,280 | 5/31 | Carpenter | 318—335 |
| 1,961,842 | 6/34 | Broege | 137—36 |
| 2,756,982 | 7/56 | Tuscher | 137—36 |

RICHARD C. QUEISSER, *Primary Examiner.*

JAMES J. GILL, *Examiner.*